(12) United States Patent
Queru

(10) Patent No.: US 9,043,714 B1
(45) Date of Patent: May 26, 2015

(54) ADAPTIVE USER INTERFACE FOR WIDESCREEN DEVICES

(75) Inventor: Jean Baptiste Maurice Queru, Foster City, CA (US)

(73) Assignee: Google Inc., Mountain View, CA (US)

( * ) Notice: Subject to any disclaimer, the term of this patent is extended or adjusted under 35 U.S.C. 154(b) by 63 days.

(21) Appl. No.: 13/249,309

(22) Filed: Sep. 30, 2011

Related U.S. Application Data

(63) Continuation of application No. 13/155,879, filed on Jun. 8, 2011, now abandoned.

(60) Provisional application No. 61/430,592, filed on Jan. 7, 2011.

(51) Int. Cl.
| | |
|---|---|
| G06F 3/048 | (2013.01) |
| G05B 19/18 | (2006.01) |
| A63F 13/00 | (2014.01) |
| G07F 17/32 | (2006.01) |
| A63F 13/20 | (2014.01) |
| G06F 3/0481 | (2013.01) |

(52) U.S. Cl.
CPC .......... G07F 17/3244 (2013.01); A63F 13/06 (2013.01); G06F 3/0481 (2013.01)

(58) Field of Classification Search
CPC ................................................. G07F 17/3244
See application file for complete search history.

(56) References Cited

U.S. PATENT DOCUMENTS

| | | | |
|---|---|---|---|
| 6,486,900 B1 | 11/2002 | Shen et al. | |
| 6,532,041 B1 * | 3/2003 | Monta et al. | 348/468 |
| 6,535,688 B1 * | 3/2003 | Kawamura et al. | 386/240 |
| 7,046,302 B2 * | 5/2006 | Konuma | 348/558 |
| 7,099,570 B2 * | 8/2006 | Itani | 386/233 |
| 7,577,914 B1 * | 8/2009 | Stuple et al. | 715/764 |
| 7,911,536 B2 * | 3/2011 | Dunton | 348/556 |
| 7,969,509 B2 * | 6/2011 | Harris | 348/558 |
| 8,085,348 B2 * | 12/2011 | Aoki | 348/556 |
| 2002/0019989 A1 | 2/2002 | Enomoto | |
| 2002/0047918 A1 * | 4/2002 | Sullivan | 348/397.1 |
| 2003/0025833 A1 * | 2/2003 | Mountain | 348/468 |
| 2003/0189669 A1 | 10/2003 | Bowser | |
| 2005/0017988 A1 | 1/2005 | Ackley et al. | |
| 2005/0143124 A1 | 6/2005 | Kennedy et al. | |
| 2006/0072028 A1 * | 4/2006 | Hong | 348/333.01 |
| 2006/0092306 A1 * | 5/2006 | Kim | 348/333.01 |
| 2006/0197753 A1 * | 9/2006 | Hotelling | 345/173 |
| 2007/0146526 A1 * | 6/2007 | Ozone | 348/333.01 |
| 2008/0059571 A1 | 3/2008 | Khoo | |
| 2008/0059888 A1 * | 3/2008 | Dunko | 715/744 |
| 2008/0165153 A1 | 7/2008 | Platzer et al. | |

(Continued)

*Primary Examiner* — Tadeese Hailu
(74) *Attorney, Agent, or Firm* — Troutman Sanders LLP; James E. Schutz; Rusty C. Close

(57) ABSTRACT

Methods, systems, and apparatus, including computer programs encoded on a computer storage medium, for adapting user interfaces for devices that include widescreen displays. In one aspect, a method includes determining a size characteristic of a display of a mobile device, determining a size characteristic of content that is to be displayed on the display, and comparing the size characteristic of the content to the size characteristic of the display. The method also includes selecting one or more controls to display in a portion of the display that is not to be used to display the content based on comparing the size characteristic of the content to the size characteristic of the display, displaying the content, and displaying the selected controls in a portion of the display that is not used to display the content.

10 Claims, 5 Drawing Sheets

(56) References Cited

U.S. PATENT DOCUMENTS

| | | |
|---|---|---|
| 2009/0060452 A1* | 3/2009 | Chaudhri .................. 386/95 |
| 2010/0066763 A1* | 3/2010 | MacDougall et al. ........ 345/656 |
| 2010/0087230 A1* | 4/2010 | Peh et al. .................. 455/566 |
| 2010/0088532 A1* | 4/2010 | Pollock et al. ............. 713/324 |
| 2010/0088630 A1* | 4/2010 | Morris ..................... 715/781 |
| 2010/0088639 A1* | 4/2010 | Yach et al. ................. 715/825 |
| 2010/0123737 A1* | 5/2010 | Williamson et al. ......... 345/672 |
| 2010/0128986 A1* | 5/2010 | Xu .......................... 382/190 |
| 2010/0220066 A1* | 9/2010 | Murphy ..................... 345/173 |
| 2011/0210922 A1* | 9/2011 | Griffin ..................... 345/173 |
| 2012/0144331 A1* | 6/2012 | Tolonen et al. ............. 715/769 |
| 2012/0179965 A1* | 7/2012 | Taylor ...................... 715/705 |
| 2012/0232681 A1* | 9/2012 | Mundy et al. ............... 700/94 |

* cited by examiner

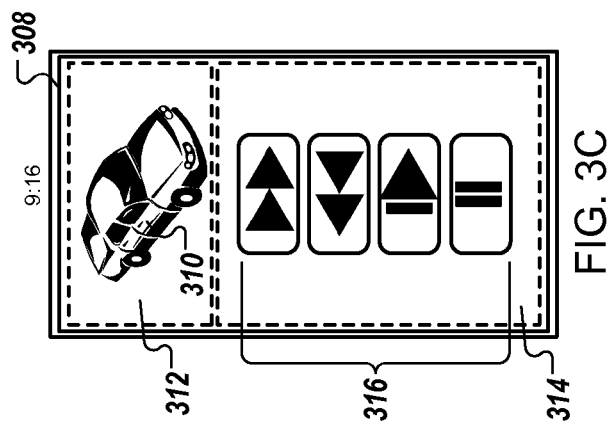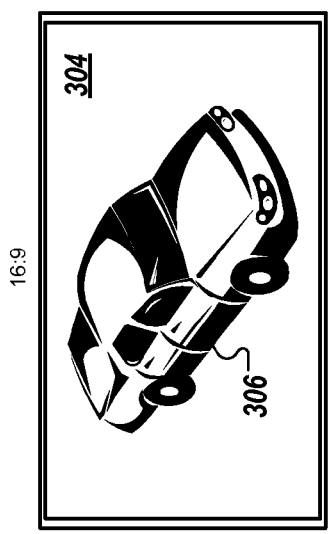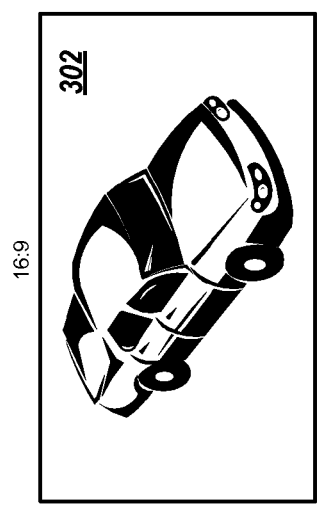

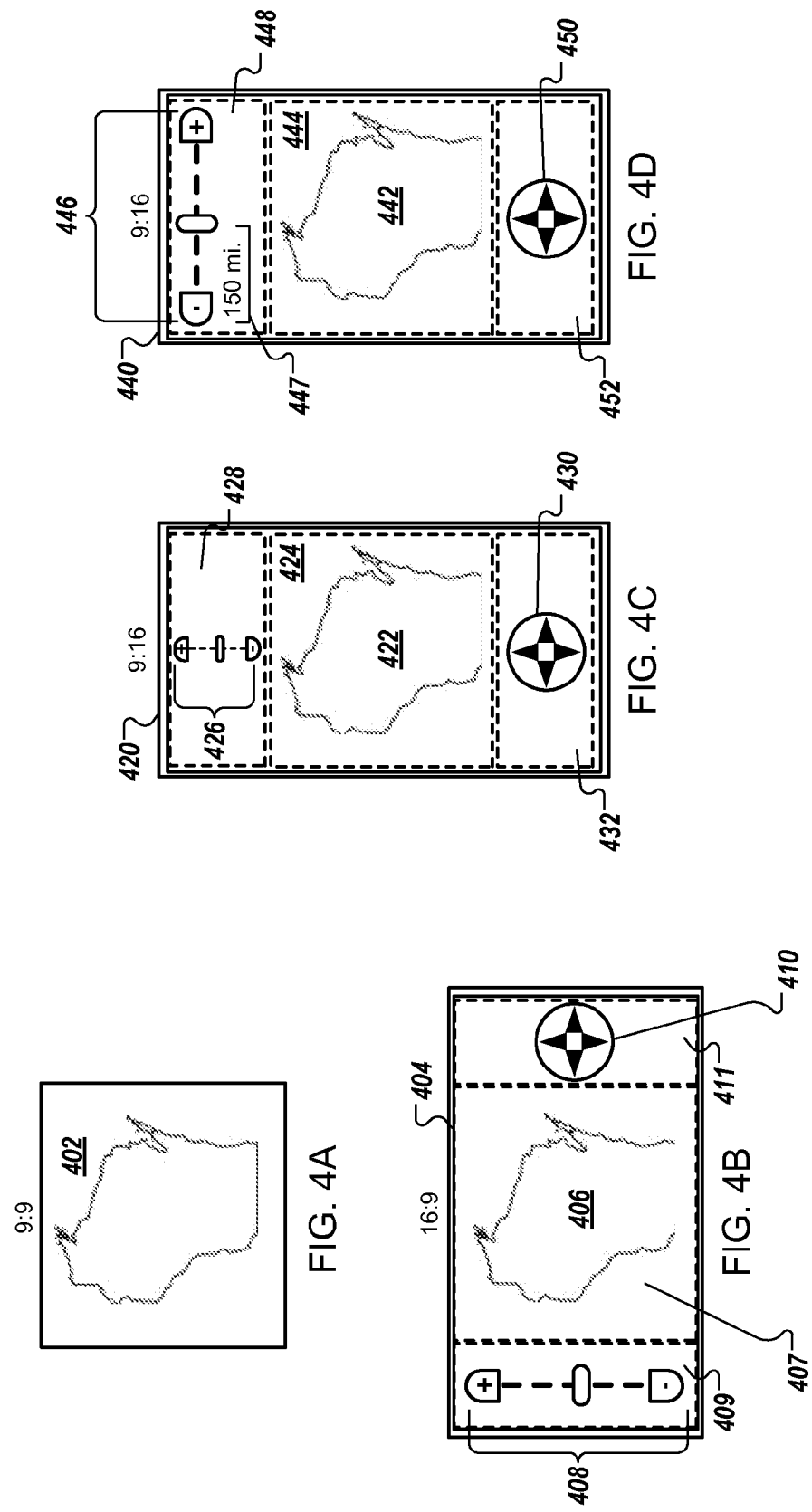

ADAPTIVE USER INTERFACE FOR WIDESCREEN DEVICES

CROSS-REFERENCE TO RELATED APPLICATIONS

This application is a continuation of and claims priority from U.S. patent application Ser. No. 13/155,879, filed Jun. 8, 2011, and claims the benefit of U.S. Pat. App. No. 61/430,592, filed Jan. 7, 2011, the contents of which are incorporated herein by reference in their entirety.

BACKGROUND

A widescreen display is a display with a width-to-height aspect ratio of greater than 4:3. When an image, e.g., a film, computer, or television image, with a different aspect ratio is displayed on a widescreen display, the aspect ratio of the image may be converted, such as through a full-screen, pan-and-scan transfer, or the image may be letterboxed, such as by adding mattes, or "black bars," at the periphery of the image.

SUMMARY

In general, one aspect of the subject matter described in this specification may be embodied in methods that include the actions of adding, by an application that is displaying an image, appropriate types of controls in a matte or black bar region of a widescreen display when determining that an image does not fill the entire portion of the display. For example, when a 4:3 film image is displayed in a 16:9 widescreen display, media player controls are displayed by the application in the unused, black bar region on one or both of the sides of the film image. If the display is rotated 90°, the media player controls are displayed by the application in the unused, black bar region on the top and/or the bottom of the film image. If a 16:9 image is subsequently displayed in the 16:9 widescreen display, the media player controls would be removed from display.

In general, another aspect of the subject matter described in this specification may be embodied in methods that include the actions of determining a size characteristic of a display of a mobile device, determining a size characteristic of content that is to be displayed on the display, and comparing the size characteristic of the content to the size characteristic of the display. The methods also include selecting one or more controls to display in a portion of the display that is not to be used to display the content based on comparing the size characteristic of the content to the size characteristic of the display, displaying the content, and displaying the selected controls in a portion of the display that is not used to display the content.

Other embodiments of these aspects include corresponding systems, apparatus, and computer programs, configured to perform the actions of the methods, encoded on computer storage devices.

These and other embodiments may each optionally include one or more of the following features. For instance, the size characteristic of the display and the content includes at least one of a height, width, or aspect ratio of the display and the content, respectively; the actions include determining to display black bars on the display adjacent to the content based on comparing the size characteristic of the content to the size characteristic of the display; displaying the selected controls further includes overlaying the selected controls over the black bars; the actions include determining a content type associated with the content, where the controls are selected further based on the content type; and/or the content type includes a media content type, and selecting the controls further includes selecting media player controls based on determining that the content is associated with a media content type.

In additional embodiments, the content type includes a game content type, and selecting the controls further includes selecting gaming controls based on determining that the content is associated with a game content type; comparing the size characteristic of the content to the size characteristic to the display further includes determining a size of the portion of the display that is not to be used to display the content; the controls are selected based on the size of the portion of the display that is not to be used to display the content; and/or the actions include defining one or more control regions of the display in which the selected controls are to be displayed, and defining a content region of the display in which the content is to be displayed.

In other embodiments, the actions include receiving a user selection of one of the selected controls, and interacting with the content based on the user selection; determining the size characteristic of the content further includes determining the size characteristic of the content when the content is displayed in its native aspect ratio or image resolution; determining the size characteristic of the content further includes determining the size characteristic of the content when the content is maximized within the display; and/or displaying the content further includes centering the content within the display, and displaying the selected controls further includes displaying the controls on a periphery of the display.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 3A, and 4A illustrate example content items.

FIGS. 3B, 3C, 4B, 4C, 4D, 5B, 5C, and 5D illustrate example displays.

Like reference numbers represent corresponding parts throughout.

DETAILED DESCRIPTION

When displaying content on a device such as a mobile device, one or more size characteristics of the display of the mobile device may be compared to one or more size characteristics of the content. For some comparison results, such as where the comparison indicates that a portion of the display is not being used to display the content, one or more controls may be selected and may be displayed in one or more black bar areas adjacent to a region of the display used to display the content. For some comparison results, such as where the comparison indicates that the content when maximized while maintaining its native aspect ratio fills the entire display, no black bar areas may exist and therefore no controls may be selected or displayed. Thus, the display of content, using the same application on the same device, may result in controls either being displayed or not being displayed, or a varying number or size of controls being displayed, based, for example, on the size of the device, the size of the content, and/or the orientation of the device.

Figure 1:
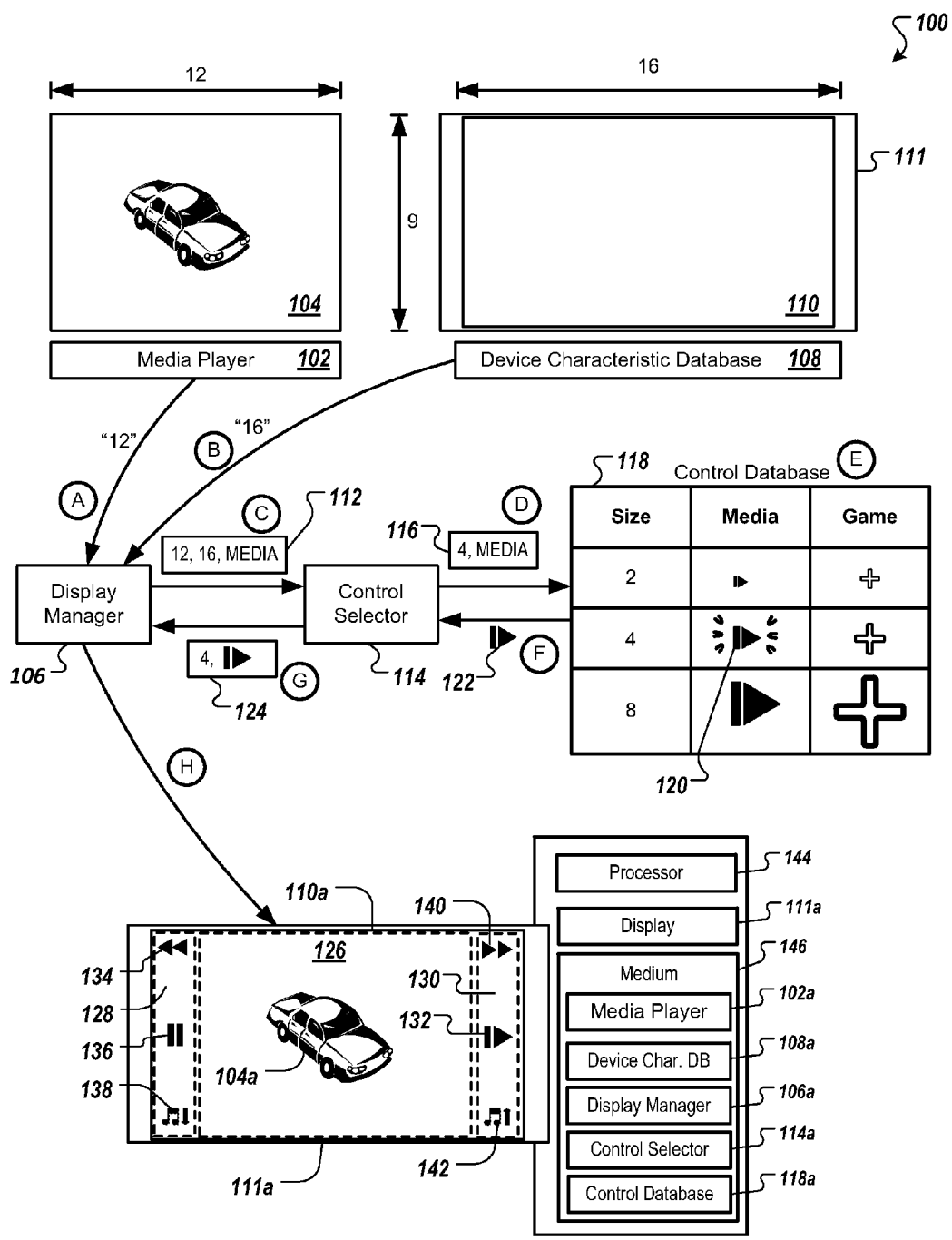
FIG. 1 is a diagram of an example system that may be used for displaying content and controls on a mobile device.

FIG. 1 is a diagram of an example system 100 that may be used for displaying content and controls on a mobile device 111, as well as a flow of data that occurs between components of the system in various states "A" to "H". In practice, the states "A" to "H" may occur in the illustrated sequence, or they may occur in a sequence that is different than is illustrated.

During a state "A", a media player 102 determines a size characteristic of a content item 104 and sends the size characteristic to a display manager 106. The media player 102 may be an application that is able to play or otherwise output various types of content for consumption by a user of the mobile device 111. For example, a user may use the media player 102 to play video content, listen to a ringtone, view electronic wallpaper, view image content, read an electronic book, play a game, browse a map, or consume some other type of content.

In general, and as discussed in more detail below, the media player 102 may add appropriate types of controls in a matte or black bar region of the widescreen display 110, after determining that the image 104 does not fill the entire portion of the display 110. For example, because the image 104 is a 4:3 image that is being displayed in a 16:9 widescreen display, media player controls may displayed by the application in the unused, black bar region on one or both of the sides of the film image.

In more detail, the media player 102 may determine one or more size characteristics of the image 104. For example, the media player 102 may determine a width characteristic (e.g., "12" units). As another example, a height characteristic (e.g., "9" units) may also be determined. As yet another example, an aspect ratio ("4:3") may be determined. The content item 104 may have, for example, a native cinematic or video aspect ratio.

During a state "B", the display manager 106 queries a device characteristic database 108 to determine a size characteristic of a display 110 of a device 111. For example, a width of the display device 110 (e.g., "16" units) can be determined. The display 110 may be, for example, a touch screen display and may be a widescreen display. The device 111 may be, for example, a mobile device. The size characteristic of the display 110 may be determine in other ways, such as by invoking a hardware or software function that outputs the screen characteristic, or information that may be used by the display manager 106 to determine the screen characteristic.

During a state "C", the display manager 106 sends information 112 to a control selector 114. The information 112 may include, for example, the size characteristic of the content item 104 (e.g., width of "12" units), the size characteristic of the display 110 (e.g., width of "16" units), and an indication of the content type of the content item 104 (e.g., "media"). During a state "D", the control selector 114 compares the size characteristic of the content item 104 to the size characteristic of the display 110. For example, the width of "12" units of the content item 104 may be compared to the width of "16" units of the display 110 to determine a width difference of "4" units.

During a state "E", the control selector 114 queries a control database 118 using a query 116. The query 116 includes a difference in size (e.g., "4") between the size characteristic of the content item 104 and the size characteristic of the display 110 and an indication of the type of the content item 104 (e.g., "media).

During a state "F", the control selector 114 identifies a control 120 in the control database 118 that is appropriate to display in the black bar region based on the query 116. The control 120 has a size (e.g., "4") and a media type (e.g., "media") that matches (or that is similar to) the query 116. The control selector 114 may identify the control 120 by a control indicator 122. The control indicator 122 may be, for example, a control identifier, or may include code that, when invoked, displays a control and/or performs a function associated with the control indicator 122. Although FIG. 1 illustrates the identification of one control in the control database 118, in some implementations, the control selector 114 identifies a set of multiple controls based on the query 116.

During a state "G", the control selector 114 sends information 124 to the display manager 106. The information 124 includes the determined difference in size between the size characteristic of the content item 104 and the size characteristic of the display 110 (e.g., "4") and the control indicator 122. In some implementations, the information 124 includes multiple control indicators.

During a state "H", the display manager 106 identifies a region of the display 110 to be used for displaying the content item 104 and displays the content item 104 in the identified region. For example, a content item 104a is shown displayed in a content region 126 of a display 110a of a device 111a. The display manager 106 also determines, based on the determined difference in size between the size characteristic of the content item 104 and the size characteristic of the display 110, a size and location of one or more portions of the display 110 that are not to be used to (e.g., not necessary to) display the content item 104 on the display 110.

For example, the display manager 106 may identify control regions 128 and 130. The display manager 106 displays a control 132 corresponding to the control indicator 122 in the control region 130. As mentioned, the control selector 114 may select multiple controls and may send multiple control indicators corresponding to the multiple selected controls to the display manager 106. In response to receiving multiple control indicators, the display manager 106 may display multiple controls in the control regions 128 and 130. For example, controls 134, 136, and 138 are shown displayed in the control region 128 and controls 140 and 142 are shown displayed in the control region 130.

The device 111 and the device 111a may each be, for example, a laptop computer, a "netbook" computer, a mobile phone, PDA (Personal Digital Assistant), smart phone, BlackBerry™, portable music player, an e-book reader, a tablet computer, or some other handheld or mobile device. The device 111a includes one or more processors 144, the display 111a, and a computer-readable medium 146. The processors 144 may each be a processor suitable for the execution of a computer program, such as a general or special purpose microprocessor.

The computer-readable storage medium 146 stores and records information or data, and may be an optical storage medium, magnetic storage medium, flash memory, or any other storage medium type. The computer-readable medium 146 includes a media player 102s, a device characteristic database 108a, a display manager 106a, a control selector 114a, and a control database 118a. The device characteristic database 108a, the display manager 106a, the control selector 114a, and a control database 118a may be, respectively, the device characteristic database 108, the display manager 106, the control selector 114, and a control database 118, as described above.

Figure 2:
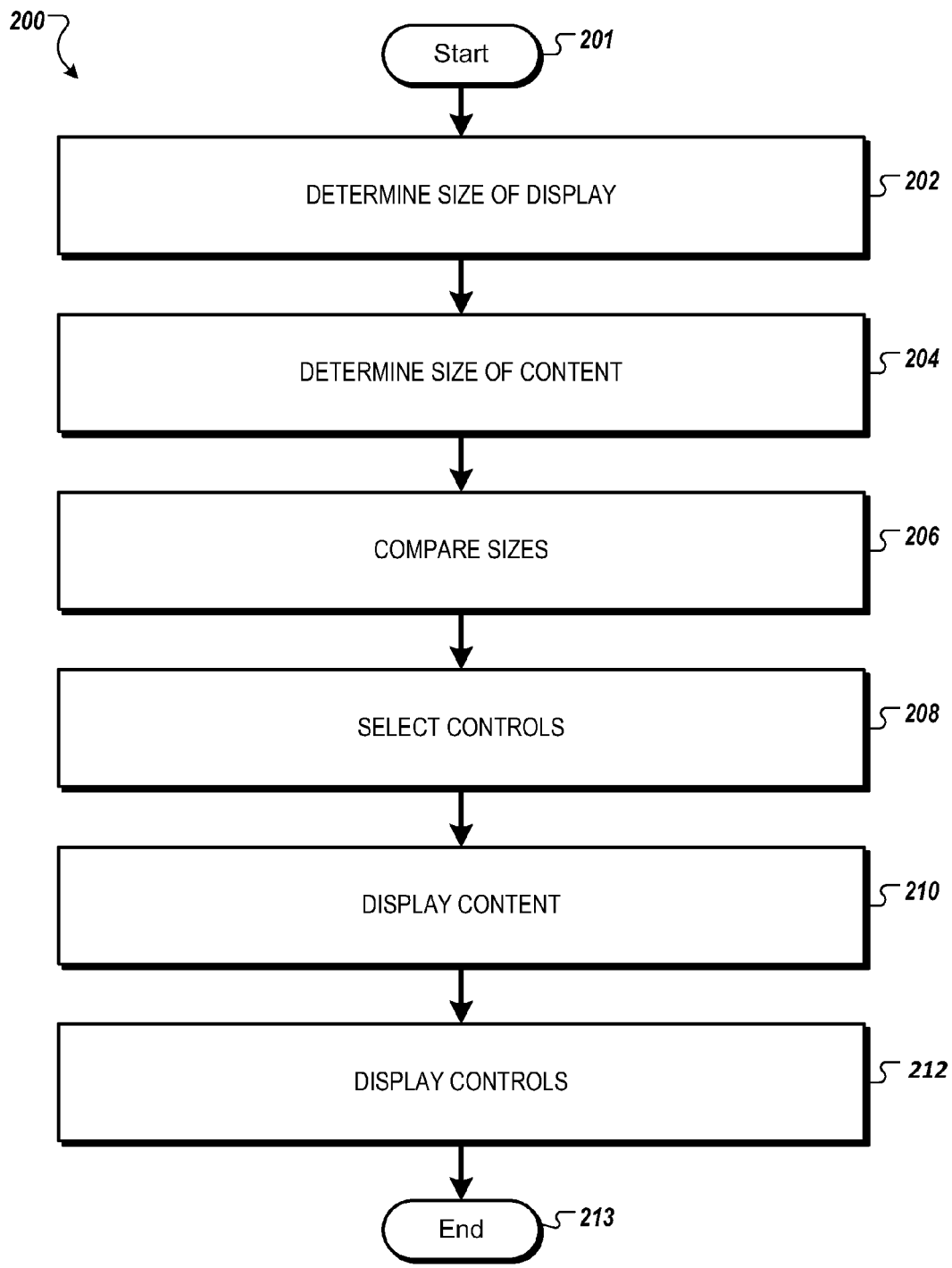
FIG. 2 is a flowchart of an example process for adapting user interfaces.

FIG. 2 is a flowchart of an example process 200 for adapting user interfaces. Briefly, the process 200 includes determining a size characteristic of a display of a mobile device, determining a size characteristic of content that is to be displayed on the display, comparing the size characteristic of the content to the size characteristic of the display, selecting one or more controls to display in a portion of the display that is not to be used to display the content based on comparing the size characteristic of the content to the size characteristic of the display, displaying the content, and displaying the selected controls in a portion of the display that is not used to display the content.

In further detail, when the process 200 begins (201), a size characteristic of a display of a mobile device is determined (202). The display may be, for example, a touch screen display. As another example, the display may be a widescreen display. The size characteristic may be, for example, a width of the display, a height of the display, an aspect ratio of the display, or some other physical or other characteristic of the display. In some implementations, more than one characteristic may be determined or a composite characteristic which includes multiple characteristics of the display may be determined. For example, a width-by-height composite characteristic may be determined.

The size characteristic may be determined, for example, by a display manager. The display manager may, for example, look up one or more size characteristics in a device characteristics or system database. Other examples include the display manager determining the size characteristic by executing a system or other function call or by submitting a request to a service or to some other system. The size characteristic may be determined at various times. For example, the size characteristic may be determined at a system configuration time, at each system reboot or startup time, or each time content is to be displayed on the display.

A size characteristic of content that is to be displayed on the display is determined (204). The size characteristic may be determined, for example, in response to a request to display the content on the display. The content may be, for example, video content, image content, a document, game content, or some other type of content. The size characteristic of content may be, for example, a width of the content, a height of the content, an aspect ratio of the content, or some other characteristic, such as a width-by-height characteristic of the content.

In some implementations, the size characteristic of the content is determined when the content is displayed in its native aspect ratio or image resolution. For example, video content may have a native, cinematic aspect ratio of "4:3". In some implementations, the size characteristic of the content is determined when the content is maximized within the display. For example, the size characteristic may be determined based upon the content being sized so as to fill the display horizontally and/or vertically, while maintaining the native aspect ratio of the content.

The size characteristic of the content is compared to the size characteristic of the display (206). For example, a size difference between the size characteristic of the display and the size characteristic of the content may be determined. For example, a difference in height, width, height and width, or aspect ratio may be determined. If multiple display size characteristics and multiple content size characteristics have been determined, multiple size differences may be determined. For example, both a difference in height and a difference in width may be determined.

If the size characteristic of the display is determined based upon the content being maximized within the display, one or more determined size differences may be zero. For example, if the content is maximized within the display so that the content fills the display both horizontally and vertically, then a width size difference and a height size difference may be determined to be zero. If the content fills the display vertically but not horizontally, a height size difference may be determined to be zero and a width difference may be determined to be non-zero. If the content fills the display horizontally but not vertically, a height size difference may be determined to be non-zero and a width difference may be determined to be zero.

If, based on comparing the size characteristic of the content to the size characteristic of the display, one or more size differences are non-zero, a size of one or more portions of the display that are not to be used to display the content may be determined. For example, suppose that the width and height of the display are "16" units and "9" units, respectively, and suppose also that the width and height of the content maximized within the display are ten units and "9" units, respectively. A content region used to display the content may be defined as a region ten units wide by "9" units high.

Continuing the above example, a height difference between the height of the display and the height of the content may be determined to be zero and a width difference between the width of the display and the width of the content may be determined to be six units. After accounting for the displaying of the content in the content region, a portion of the display measuring six units by "9" units may be not used to display the content. In some implementations, such a portion not used for display of content may be referred to as a "black bar" area or region.

In some implementations, multiple sizes of multiple unused portions may be defined. For instance, in the example just discussed, two portions each measuring three units by "9" units may be defined. Two portions may be defined, for example, in anticipation of displaying the content in the center of the display with a black bar area on either side of the content.

One or more controls are selected to display in a portion of the display that is not to be used to display the content based on comparing the size characteristic of the content to the size characteristic of the display (208). The one or more controls may be selected, for example, from a controls database. The one or more controls may be selected based on a determined content type. For example, if the content is determined to be of a media content type, then one or more media player controls (e.g., play, pause, stop, rewind, fast forward) may be selected. As another example, if the content is determined to be an image, one or more image controls (e.g., zoom, pan) may be selected. As yet another example, if the content is determined to be game content, one or more gaming controls (e.g., fire, move player) may be selected. In some implementations, gaming controls are selected based upon the type of the content being game content and also upon a game sub-type. For example, driving controls may be selected if the game content is a driving game.

The one or more controls may be selected based on one or more sizes of one or more portions of the display that are not to be used to display the content. For example, one or more black bar areas may each be defined as a region of the display where controls are to be displayed. A black bar area may be defined, for example, as an area above, below, to the left of, or to the right of the content region. A control may be selected, for example, based on the size of the control fitting within a particular black bar area. As another example, the number of controls selected may be based on the number of controls that can fit within all of the black bar areas defined for displaying controls. In some implementations, candidate controls have an associated priority, and controls may be selected in order of priority until the maximum number of controls that can fit in all of the black bar areas defined for displaying controls have been selected.

In some implementations, the controls database includes multiple versions of the same control, where each version of a control has a different size. In such implementations, a version of a particular control may be selected so as to maximize the number of controls selected (e.g., a smallest version of each control may be selected). In some implementations, the number of controls selected and/or the version selected for one or more controls may be based on a target control size, or other criteria that may take into account multiple factors, such as maximizing the number of controls selected while maintaining a certain amount of unused space around each control (e.g., for appearance purposes and for ease of control selection).

The content is displayed (210). For example, the content may be centered within the display. The content may be displayed so as to be maximized within the display while maintaining the native aspect ratio of the content. That is, content may be maximized but may not be "stretched" in one dimension more than another dimension, as doing so may distort the content.

The selected controls are displayed in a portion of the display that is not used to display the content (212), thereby ending the process 200 (213). For example, the controls may be displayed on a periphery of the display. As another example, each selected control may be displayed in a black bar area. That is, each selected control may be overlayed over a black bar area.

A user selection of one of the selected controls may be received. For example, the user may select a "play" control. An interaction with the content may occur based on the user selection of a control. For example, a movie may be played in response to selection of a "play" control.

FIGS. 3A to 3C illustrate the displaying of a content item on multiple displays having different sizes. FIG. 3A illustrates an example content item 302. The content item 302 may be, for example, video content, image content, or some other type of content. The content item 302 may have a native aspect ratio, such as a "16:9" ratio.

FIG. 3B illustrates an example display 304. The display 304 may be, for example, a display of a mobile device. The display 304 has a size of "16" units by "9" units. The content item 302 of FIG. 3A may be displayed on the display 304 (e.g., as illustrated by a content item 306). The content item 306 may be maximized within the display 304. Since the aspect ratio of the content item 306 is the same ratio as the width-to-height ratio of the display 304, the content item 306 maximized within the display 304 fills the entire display 304. In such a situation, there are no black bar areas in the display 304 if the content item 306 is maximized within the display, and therefore, in this example, no controls are selected or displayed on the display 304.

As another example, FIG. 3C illustrates an example display 308. The display 308 has a size of "9" units by "16" units. The content item 302 of FIG. 3A may be displayed in the display 308. For example, the content item 302 may be displayed as a content item 310 in a content region 312. If the content item 310 is maximized within the display 308, the content item 310 fills the display 308 horizontally, but does not fill the display 308 vertically. That is, a black bar area 314 may be defined that is not used to display the content item 310. Based upon determining that not all of the display 308 is to be used to display the content item 310, controls 316 may be selected and may be displayed in the black bar area 314.

The examples of FIG. 3B and FIG. 3C illustrate that the same content item, displayed on different displays, may result in either controls being displayed or controls not being displayed. Whether controls are displayed on a particular display may be based, for example, on whether the aspect ratio of the content matches a width-to-height ratio of the display.

FIGS. 4A to 4D illustrate different scenarios of displaying a content item and controls on multiple displays having different sizes. FIG. 4A illustrates an example content item 402. The content item 402 has a size of "9" units by "9" units. The content item 402 is a map (e.g., a map of the state of Wisconsin, of the United States).

FIG. 4B illustrates an example display 404. The display 404 may be, for example, a display of a mobile device. The display 404 has a size of "16" units by "9" units. The content item 402 of FIG. 4A may be displayed on the display 404 (e.g., as illustrated by a content item 406). The content item 406 is displayed in a content region 407 of the display 404 that is centered horizontally within the display 404. A zoom control 408 is displayed in a black bar area 409 and a pan control 410 is displayed in a black bar area 411.

As other examples, FIG. 4C and FIG. 4D illustrate example displays 420 and 440, respectively. The displays 420 and 440 may each be, for example, a display of a mobile device. Each of the displays 420 and 440 has a size of "9" units by "16" units. The content item 402 of FIG. 4A may be displayed on both the display 420 and the display 440 (e.g., as illustrated by a content item 422 and a content item 442, respectively). The content item 422 is displayed in a content region 424 of the display 420 that is centered vertically within the display 420. The content item 442 is displayed in a content region 444 of the display 440 that is centered vertically within the display 440. A zoom control 426 is displayed in a black bar area 428 and a pan control 430 is displayed in a black bar area 432. A zoom control 446 and a distance control 447 are displayed in a black bar area 448 and a pan control 450 is displayed in a black bar area 452.

FIGS. 4A to 4D illustrate that a content item being displayed on multiple displays of different sizes may result in controls of different sizes being displayed. For example, the zoom control 408 is larger than the zoom control 426. As another example, a content item being displayed on multiple displays of different sizes may result in some controls being shown in a different orientation on different displays (e.g., the zoom control 408 is shown in a vertical orientation and the zoom control 446 is shown in a horizontal orientation). As yet another example, a content item being displayed on multiple displays of different sizes may result in some controls being displayed on some displays and not on other displays. For example, the distance control 447 is shown on the display 440 but not on the display 420 or on the display 404. As still yet another example, a content item being displayed on multiple displays of different sizes may result in the content item being displayed in a different type of content region. For example, the content region 407 is centered horizontally within the display 404 and fills the height but not the width of the display 404 while the content region 424 is centered vertically within the display 420 and fills the width but not the height of the display 420.

Figure 5A:
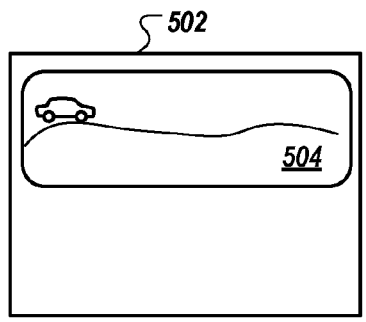
Figure 5B:
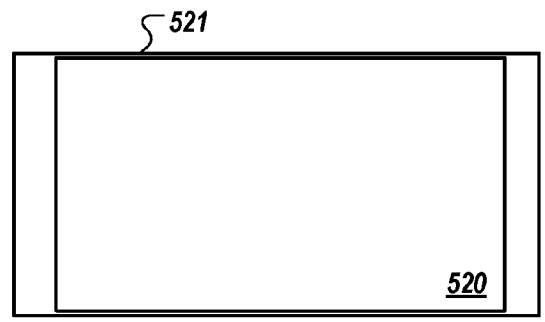

FIGS. 5A to 5D illustrate differences of number and placement of control regions. FIG. 5A illustrates an example content item 502. The content item 502, which may be gaming content for a driving game, includes a driving area 504. FIG. 5B illustrates an example display 520. The display 520 may be, for example, a display of a mobile device 521.

Figure 5C:
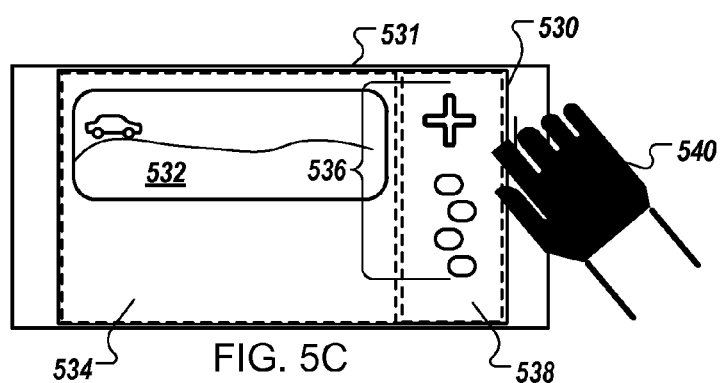

FIG. 5C illustrates an example display 530 of a mobile device 531. The example display 530 may be, for example, the display 520 of FIG. 5B displaying the gaming content 502 of FIG. 5A (e.g., as illustrated by gaming content 532). The gaming content 532 is displayed in a content region 534, where the content region 534 is on the left side of the display 530. Gaming controls 536 are displayed in a control region 538, where the control region 538 is on the right side of the display 530.

If, as illustrated in FIG. 5C, a content region occupies one side of the display 530 and a control region occupies the other side of the display 530 and if, as shown, the user holds the mobile device 531 with only their right hand (e.g., only a hand 540), then it may be awkward for the user to hold the mobile device 531 and still select the controls 536. As another example, the user may hold the right side of the mobile device 531 with their right hand (e.g., the hand 540) but if the user holds the left side of the mobile device 531 with their left hand (not shown), then it may be difficult for the user to hold the mobile device 531 without their left hand or fingers of their left hand covering a portion of the gaming interface 532.

Figure 5D:
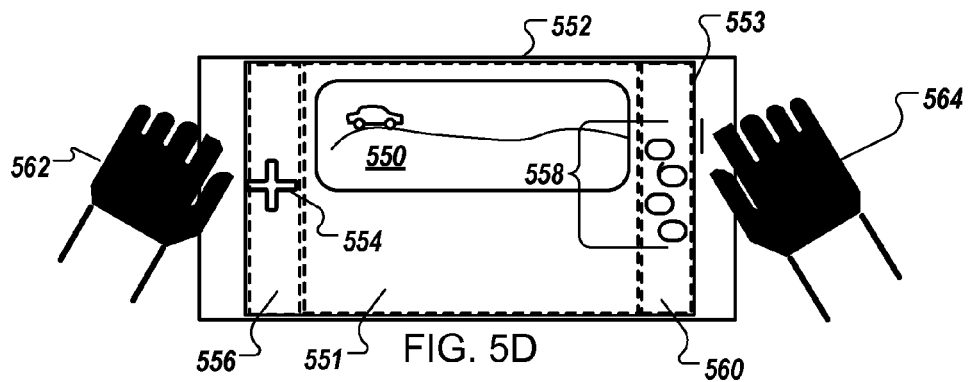

As shown in FIG. 5D, gaming content 550 may be displayed in a centered content region 551 of a display 552 of a mobile device 553, a control 554 may be displayed in a control region 556 located on the left side of the display 552, and controls 558 may be displayed in a control region 560 located on the right side of the display 552. In an arrangement including the centered content region 556 and the control regions 556 and 560 located on the sides of the display 552, the user may hold the mobile device 553 using both their left and right hands (e.g., hands 562 and 564, respectively). In such an arrangement, the user may use their left hand (e.g., the hand 562) to hold the left side of the mobile device 553 and to interact with the control 554 and may use their right hand (e.g., the hand 564) to hold the right side of the mobile device 553 and to interact with the controls 558, all while avoiding having either the hand 562 or the hand 564 cover any of the gaming content 550.

A number of implementations have been described. Nevertheless, it will be understood that various modifications may be made without departing from the spirit and scope of the disclosure. For example, various forms of the flows shown above may be used, with steps re-ordered, added, or removed.

Implementations and all of the functional operations described in this specification may be implemented in digital electronic circuitry, or in computer software, firmware, or hardware, including the structures disclosed in this specification and their structural equivalents, or in combinations of one or more of them. These may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, interfaces may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be included in a computing system that includes a back end component, e.g., as a data server, or that includes a middleware component, e.g., an application server, or that includes a front end component, e.g., a client computer having a graphical user interface or a Web browser through which a user may interact with one or more implementations, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations have been described. Other embodiments are within the scope of the following claims. For example, the actions recited in the claims may be performed in a different order and still achieve desirable results.

What is claimed is:

1. A non-transitory computer-readable medium storing instructions that, when executed by one or more processors, cause a computing device having a touch screen display to:
   responsive to receiving an indication of an image to be displayed on the touch screen display:
   determine a width of the touch screen display;
   determine a width of the image;
   determine a media content type associated with the image;
   calculate a difference between the width of the image and the width of the touch screen display;
   select one or more interactive controls from a control database based on the calculated difference between the width of the image and the width of the touch screen display and based on the media content type associated with the image, and further wherein selecting one or more interactive controls from the control database comprises querying the control database using a query with parameters comprising (1) the calculated difference between the width of the image and the width of the touch screen display and (2) the media content type associated with the image;
   display the image; and
   display the selected one or more interactive controls in the portion of the touch screen display that is not used to display the image.

2. The medium of claim 1, wherein the one or more processors are further configured to:
   define one or more control regions of the touch screen display in which the selected interactive controls are to be displayed; and
   define a content region of the touch screen display in which the image is to be displayed.

3. The medium of claim 1, wherein the the one or more processors are further configured to:
   receive a user selection of one of the selected interactive controls; and
   interact with the image based on the user selection.

4. The medium of claim 1, wherein determining the width of the image further comprises determining the width of the image when the image is displayed in its native aspect ratio or image resolution.

5. The medium of claim 1, wherein determining the width of the image further comprises determining the width of the image when the image is maximized within the touch screen display.

6. The medium of claim 1, wherein:
   displaying the image further comprises centering the image within the touch screen display; and
   displaying the selected interactive controls further comprises displaying the selected interactive controls on a periphery of the display.

7. A method comprising:
   determining a width of a touch screen display of a mobile device;
   responsive to receiving an indication of a first content to be displayed on the touch screen display:
   determining a first width of the first content;
   determining a first media content type associated with the first content;
   calculating, by the mobile device, a first difference between the width of the touch screen display and the first width of the content;
   selecting, by the mobile device, a first set of interactive controls, wherein the selecting is based on at least (1) the first difference between the width of the touch screen display and the first width of the first content and (2) the first media content type, and wherein the selecting further comprises querying a control database using a query, wherein at least the first difference and the first media content type are parameters to the query;
   outputting, for display: (1) the first content in a first portion of the touch screen display and (2) the first set of interactive controls in a second portion of the touch screen display that is not used to display the first content;

responsive to receiving an indication of a second content to be displayed on the touch screen display:
  determining a second width of the second content;
  determining a second media content type associated with the second content;
  calculating, by the mobile device, a second difference between the width of the touch screen display and the second width of the second content;
  selecting, by the mobile device, a second set of interactive controls, wherein the selecting is based on at least (1) the second difference between the width of the touch screen display and the second width of the second content and (2) the second media content type; and
  outputting, for display: (1) the second content in a third portion of the touch screen display and (2) the second set of interactive controls in a fourth portion of the touch screen display that is not used to display the second content.

8. The method of claim 7, further comprising:
  responsive to receiving the indication of the first content to be displayed, determining to display bars on the display adjacent to the first content based on the calculated first difference between the width of the touch screen display and the first width of the first content.

9. The method of claim 8, wherein outputting the first set of interactive controls further comprises overlaying the first set of interactive controls over the bars.

10. The method of claim 7, wherein:
  displaying the first content further comprises positioning the first content along a single side edge only of the touch screen display; and
  displaying the selected interactive controls further comprises displaying the selected interactive controls on the other side edge only of the touch screen display.

* * * * *